(12) United States Patent
Zhao

(10) Patent No.: US 8,271,695 B2
(45) Date of Patent: Sep. 18, 2012

(54) MOTOR CONTROLLER FOR ELECTRONIC DRIVING MOTOR AND METHOD FOR CONTROLLING THEREOF

(75) Inventor: Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 12/877,122

(22) Filed: Sep. 8, 2010

(65) Prior Publication Data

US 2011/0191502 A1    Aug. 4, 2011

(30) Foreign Application Priority Data

Jan. 29, 2010    (CN) .......................... 2010 1 0117346

(51) Int. Cl.
*G06F 3/00* (2006.01)

(52) U.S. Cl. ........................................................ 710/10
(58) Field of Classification Search ...................... 710/10
See application file for complete search history.

(56) References Cited

U.S. PATENT DOCUMENTS

| | | | | |
|---|---|---|---|---|
| 4,171,541 A * | 10/1979 | Houpt | ............................ | 700/18 |
| 5,337,698 A * | 8/1994 | Widmyer | .................... | 119/51.04 |
| 5,453,933 A * | 9/1995 | Wright et al. | ................. | 700/181 |
| 5,461,717 A * | 10/1995 | Notarianni et al. | ........... | 710/303 |
| 5,570,568 A * | 11/1996 | Kramer | ............................ | 53/479 |
| 5,657,208 A * | 8/1997 | Noe et al. | ....................... | 361/790 |
| 5,816,152 A * | 10/1998 | Nelgner et al. | ................ | 101/181 |
| 6,161,031 A * | 12/2000 | Hochman et al. | .............. | 600/407 |
| 6,170,241 B1 * | 1/2001 | Shibilski et al. | ................ | 56/11.9 |
| 6,989,646 B2 * | 1/2006 | Jackson et al. | ................. | 318/645 |
| 7,272,476 B2 * | 9/2007 | Ortiz et al. | ....................... | 701/33 |
| 2002/0084173 A1 * | 7/2002 | Paquette | .................... | 198/781.06 |
| 2005/0202847 A1 * | 9/2005 | Yu et al. | .......................... | 455/560 |
| 2008/0207011 A1 * | 8/2008 | Goosens et al. | ................. | 439/61 |
| 2009/0027057 A1 * | 1/2009 | Anderson et al. | .............. | 324/457 |
| 2010/0300163 A1 * | 12/2010 | Loughlin et al. | ................ | 70/301 |

* cited by examiner

*Primary Examiner* — Chun-Kuan Lee
*Assistant Examiner* — Ronald Modo
(74) *Attorney, Agent, or Firm* — Matthias Scholl P.C.; Matthias Scholl

(57) ABSTRACT

A motor controller for an electronic driving motor, including at least a controlling and processing unit, an interface circuit unit, and an identifying circuit. The controlling and processing unit is disposed on a mother circuit board. The interface circuit unit and the identifying circuit are disposed on a daughter circuit board. The mother circuit board and the daughter circuit board are connected to each other whereby forming electric connection. The identifying circuit inputs an identifying signal to the controlling and processing unit. The controlling and processing unit automatically configured types of input/output ports of the interface circuit unit according to the identifying signal. The motor controller of the invention enables motor manufactures to reduce the number of motor types for management, reduces development cost, development cycle, and product cost, simplifies a production technique, and improves efficiency.

11 Claims, 8 Drawing Sheets

MOTOR CONTROLLER FOR ELECTRONIC DRIVING MOTOR AND METHOD FOR CONTROLLING THEREOF

CROSS-REFERENCE TO RELATED APPLICATIONS

Pursuant to 35 U.S.C. §119 and the Paris Convention Treaty, this application claims the benefit of Chinese Patent Application No. 201010117346.1 filed on Jan. 29, 2010, the contents of which are incorporated herein by reference.

BACKGROUND OF THE INVENTION

1. Field of the Invention

The invention relates to a motor controller for an electronic driving motor and a method for controlling thereof.

2. Description of the Related Art

As shown in FIG. 1, a conventional electrical unidirectional driving motor comprises a motor body and a motor controller, and the motor body comprises a stator and a rotor. As shown in FIG. 2, a conventional motor controller is disposed on a circuit board, and comprises a power supply circuit, a micro controller unit (MCU), a power drive circuit module, a rotor position sensing circuit, and multiple analog sensing circuits, and the power supply circuit comprises a rectifying circuit, a filtering circuit, and a DC-DC voltage reduction circuit. The motor controller is corresponding to the motor body, and to an application system of the motor, namely a control interface of a user-end control system, this is because that different user-end control systems are corresponding to different control signals, for example, an air-conditioner control system and a washing-machine control system are user-end control systems, but control signals thereof are completely different. A traditional method is to develop a motor and a motor controller for every type of user-end control system. However, several problems occur: 1) there are a variety of motor types for different motor manufacturers, which makes it inconvenient for management and standardization; 2) since every new user-end control system needs redeveloping a new motor, development time and cost are wasted; 3) redesign needs a new production technique and authentication cost, which increases cost; 4) application of the motor is very narrow, and wide-range application becomes inconvenient.

SUMMARY OF THE INVENTION

In view of the above-described problem, it is one objective of the invention to provide a motor controller for an electronic driving motor that can be used in various occasions by changing a daughter circuit board, has wide application, enables motor manufactures to reduce the number of motor types for management, and features reduced development cost, development cycle, and product cost, a simplified production technique, and improved efficiency.

It is another objective of the invention to provide a control method of a motor controller for an electronic driving motor.

To achieve the above objectives, in accordance with one embodiment of the invention, provided is a motor controller for an electronic driving motor, comprising a controlling and processing unit, an interface circuit unit, and an identifying circuit. The controlling and processing unit is disposed on a mother circuit board, the interface circuit unit and the identifying circuit are disposed on a daughter circuit board, the mother circuit board and the daughter circuit board are connected to each other whereby forming electric connection, the identifying circuit inputs an identifying signal to the controlling and processing unit, and the controlling and processing unit automatically configures types of input/output ports of the interface circuit unit according to the identifying signal.

In a class of this embodiment, identifying circuits corresponding to different interface circuit units output different signals whereby forming different daughter circuit boards.

In a class of this embodiment, the identifying circuit is a voltage division circuit formed by a pair of resistors serially connected to each other, and a power supply on the mother circuit board supplies power to the identifying circuit.

In a class of this embodiment, the interface circuit unit uses multiple separating circuits parallel to each other, one end of the separating circuit is connected to an output end of a user-end control system, and the other end thereof is connected to the controlling and processing unit.

In a class of this embodiment, an output end of the controlling and processing unit is connected to a power drive circuit module, an input end of the controlling and processing unit is connected to an output end of a rotor position sensing circuit, and the power drive circuit module and the rotor position sensing circuit are disposed on the mother circuit board.

In a class of this embodiment, it further comprises a power supply circuit and an analog sensing circuit disposed on the mother circuit board.

In a class of this embodiment, the output end of the user-end control system comprises eleven terminal lugs E, N, L, M1, M2, M3, M4, M5, M6, M7, and M8, the outputs lines E, N, and L are power lines connected to the mother circuit board, the outputs lines M1, M2, M3, M4, M5, M6, M7, and M8 are electrically connected to the controlling and processing unit via an optoelectronic separating circuit on the daughter circuit board.

In a class of this embodiment, a pair of slots is disposed on the mother circuit board and operates to receive the daughter circuit board, and a pair of connectors is disposed on the daughter circuit board and received in the slots.

In a class of this embodiment, the controlling and processing unit is a CPU, a micro controller unit, or a digital signal processor.

In accordance with one embodiment of the invention, provided is a control method of a motor controller, comprising setting main functional circuits of the motor controller on a mother circuit board, setting an interface circuit unit and an identifying circuit on multiple daughter circuit boards, connecting one of the daughter circuit boards to the mother circuit board, and informing a controlling and processing unit on the mother circuit board of automatically configuring types of input/output ports on the daughter circuit board by the identifying circuit on the daughter circuit board.

Advantages of the invention comprise: the mother circuit board and the daughter circuit board are connected to each other whereby forming electric connection, the identifying circuit inputs an identifying signal to the controlling and processing unit on the mother circuit board, and the controlling and processing unit automatically configures types of input/output ports of the interface circuit unit according to the identifying signal. By changing the daughter circuit board, the invention can be applied to various occasions and features wide application, and other circuit parts and software parts of the motor controller remain unchanged, which enables motor manufactures to reduce the number of motor types for management, reduces development cost, development cycle, and product cost, simplifies a production technique, and improves efficiency. In addition, since the controlling and processing unit integrates configurators of all the daughter circuit boards, as a daughter circuit board is to be changed, it is only required to activate a configurator in a controlling and processing unit corresponding to the daughter circuit board, which makes use thereof simple and convenient.

DETAILED DESCRIPTION OF THE EMBODIMENTS

Detailed description will be given below in conjunction with specific embodiments and accompanying drawings.

Figure 1:
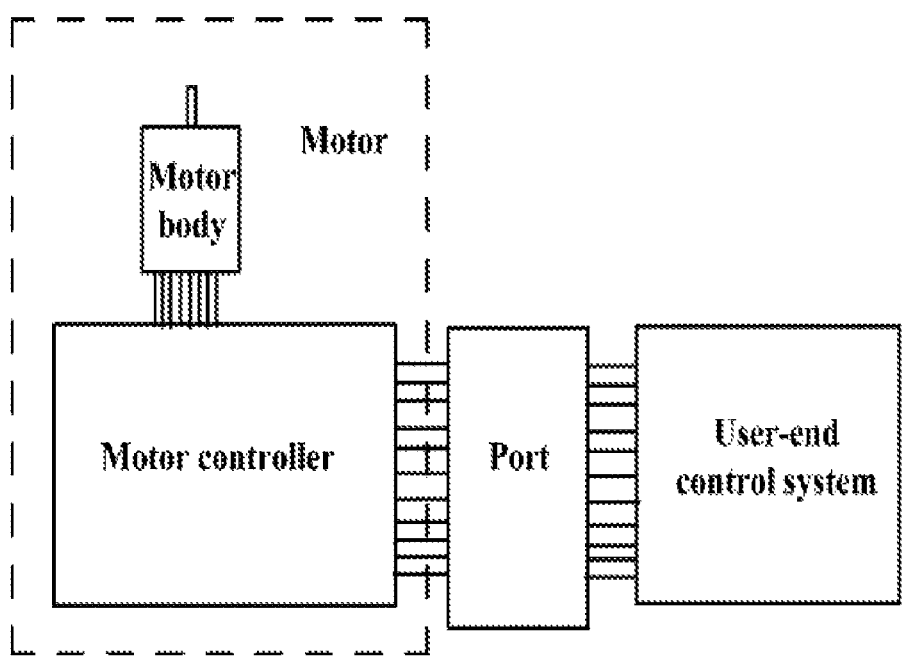
FIG. 1 is a schematic view of a motor in the related art.
Figure 2:
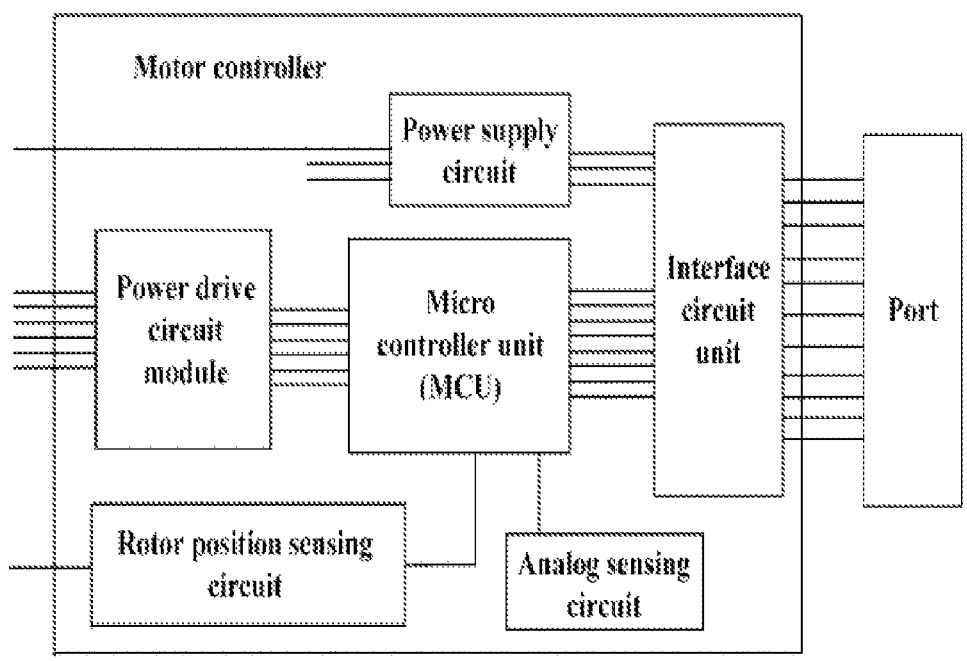
FIG. 2 is a schematic diagram of a motor controller for a motor in the related art.
Figure 3:
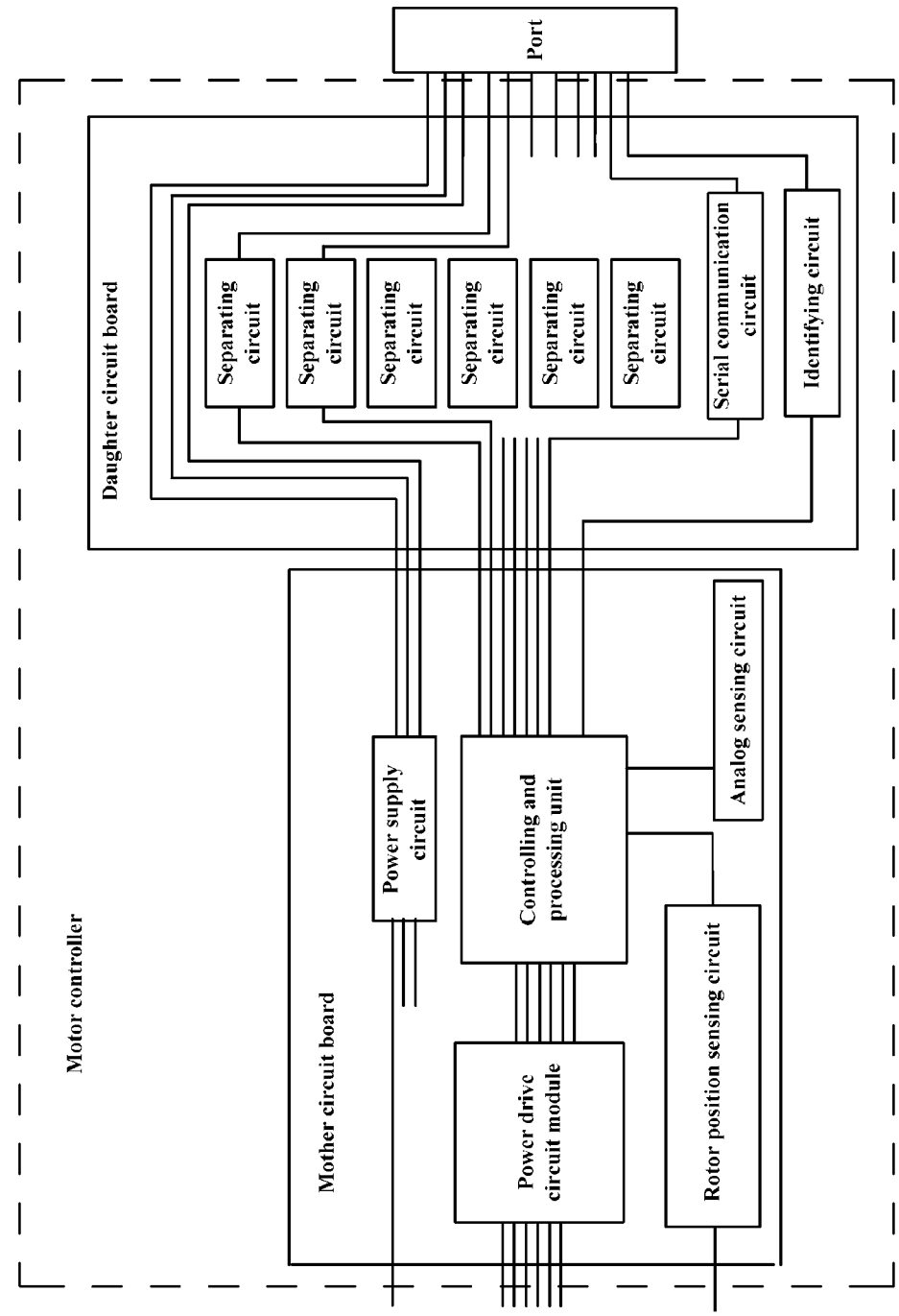
FIG. 3 is a block diagram of a motor controller of an exemplary embodiment of the invention.

As shown in FIG. 3, a motor controller for an electronic driving motor of the invention comprises a controlling and processing unit, an interface circuit unit, and an identifying circuit. The controlling and processing unit is disposed on a mother circuit board, the interface circuit unit and the identifying circuit are disposed on a daughter circuit board. The mother circuit board and the daughter circuit board are connected to each other whereby forming electric connection. The identifying circuit inputs an identifying signal to the controlling and processing unit, and the controlling and processing unit automatically configures types of input/output ports of the interface circuit unit according to the identifying signal.

Identifying circuits corresponding to different interface circuit units output different signals whereby forming different daughter circuit boards.

An output end of the controlling and processing unit is connected to a power drive circuit module, an input end of the controlling and processing unit is connected to an output end of a rotor position sensing circuit, and the power drive circuit module and the rotor position sensing circuit are disposed on the mother circuit board.

A power supply circuit and an analog sensing circuit are disposed on the mother circuit board, and the power supply circuit supplies power to all circuits. The controlling and processing unit is a CPU, a micro processor unit, or a digital signal processor.

Figure 4:
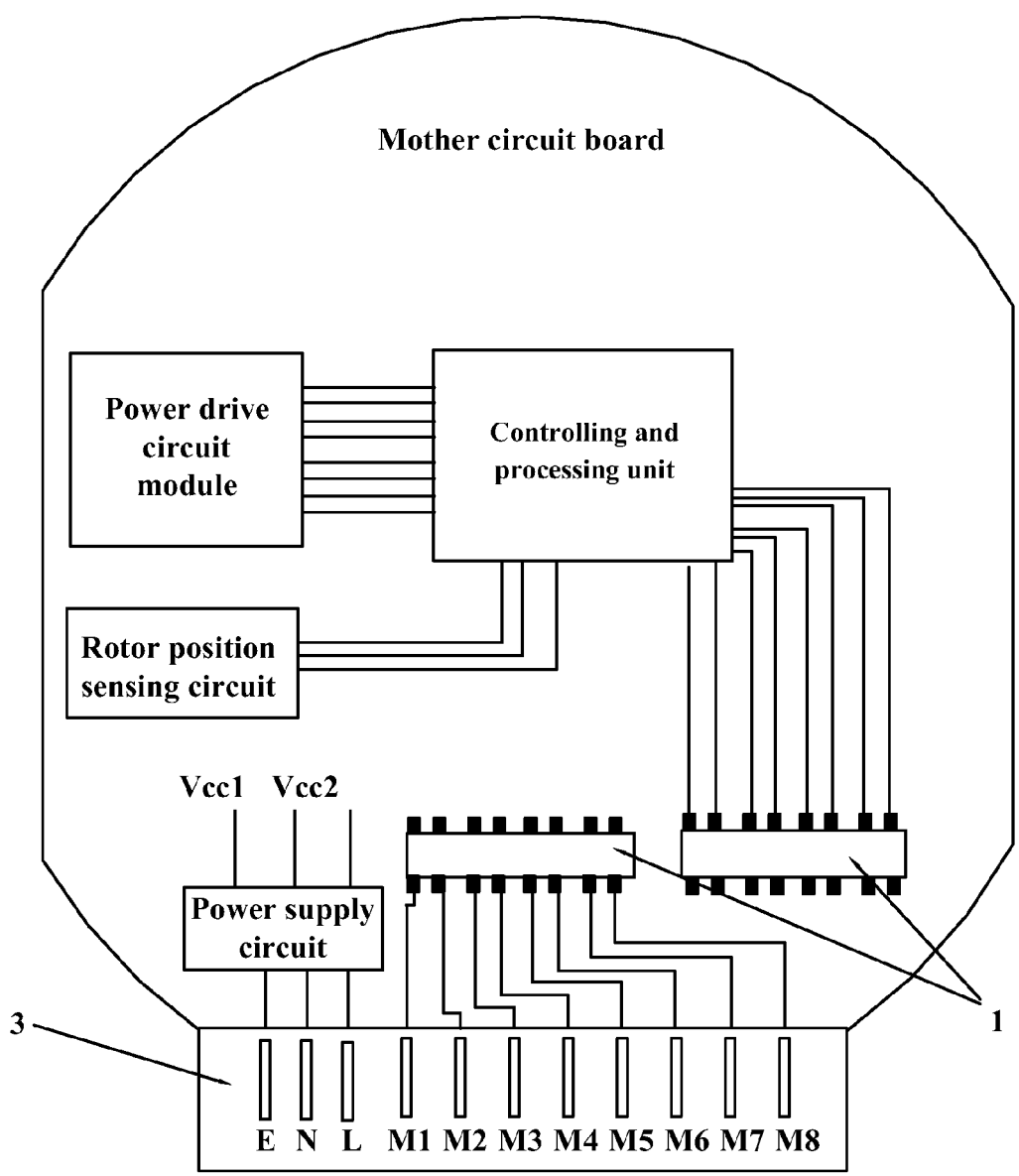
FIG. 4 is a schematic view of a mother circuit board of a motor controller of the invention.
Figure 5:
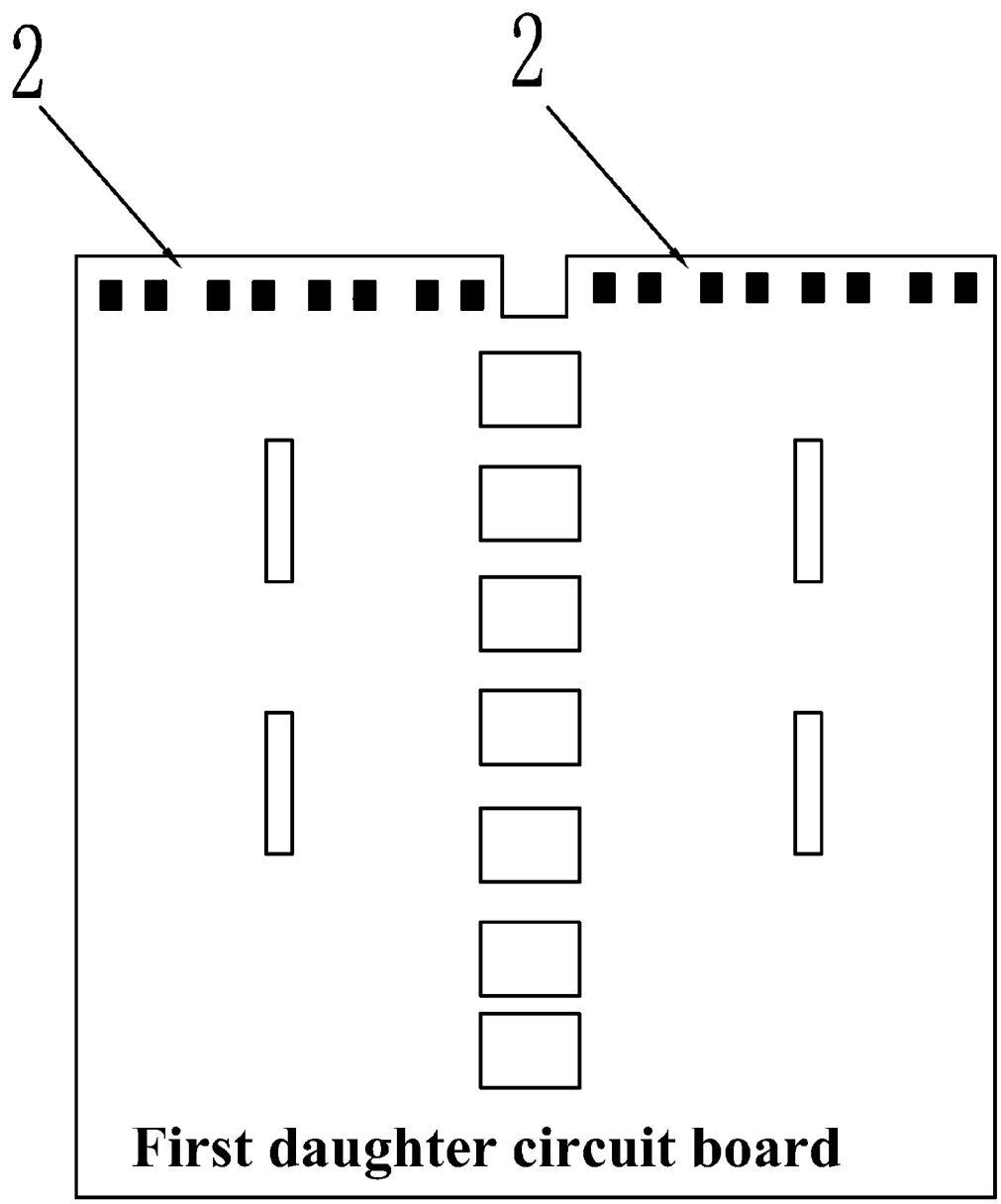
FIG. 5 is a schematic view of a first daughter circuit board of a motor controller of the invention.
Figure 6:
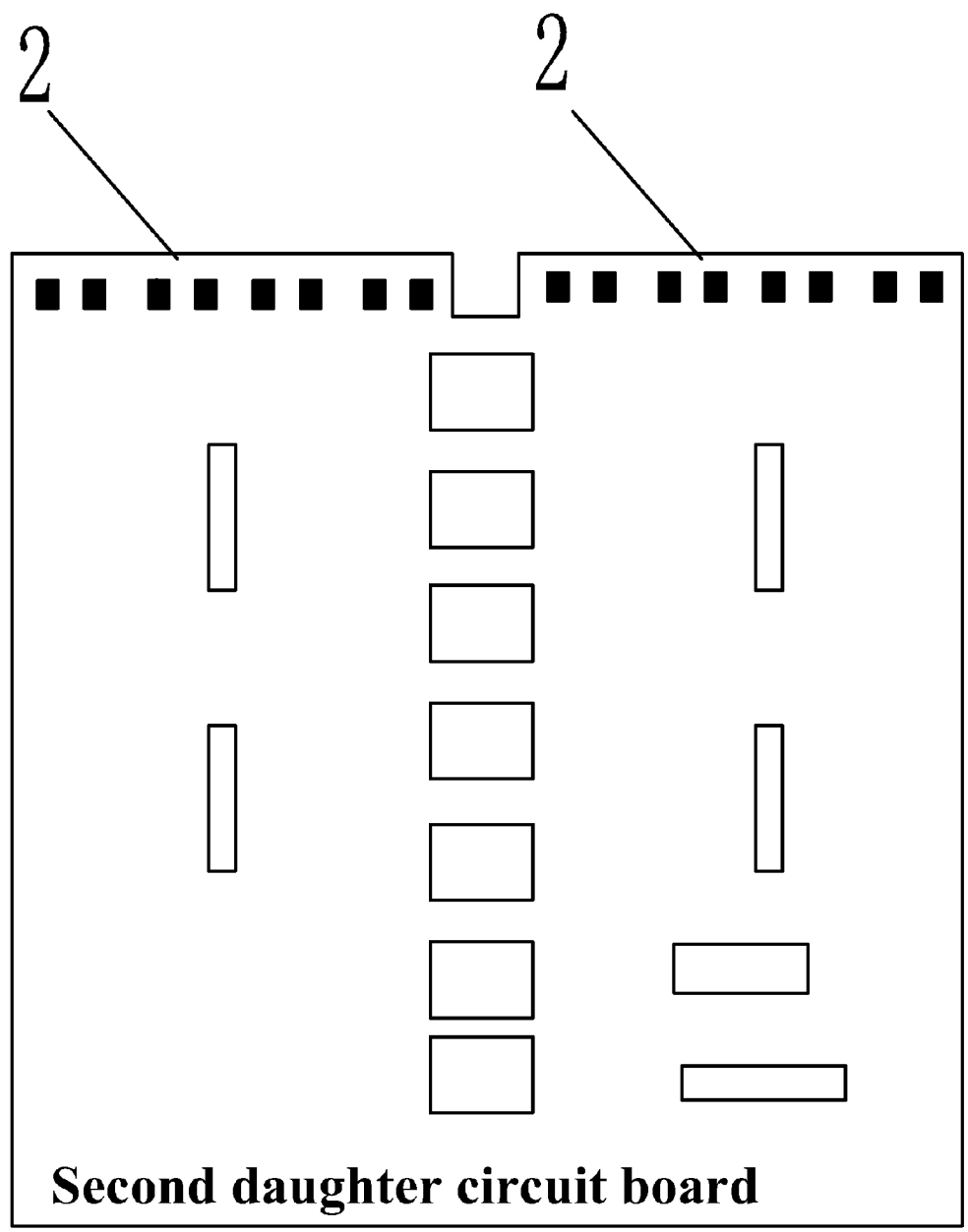
FIG. 6 is a schematic view of a second daughter circuit board of a motor controller of the invention.

As shown in FIGS. 4, 5 and 6, a port 3 is disposed on the mother circuit board, and eleven terminal lugs E, N, L, M1, M2, M3, M4, M5, M6, M7, and M8 are disposed in the port 3. The daughter circuit board is selected from a first daughter circuit board, a second daughter circuit board, and a third daughter circuit board. The terminal lugs are defined in the following Table 1:

TABLE 1

| Sequence Number | First daughter circuit board | Second daughter circuit board | Third daughter circuit board |
|---|---|---|---|
| M1 | First gear input | NG | Speed feedback signal |
| M2 | Second gear input | Mode selection | FAULT signal output |
| M3 | Third gear input | PWM signal input | NG |
| M4 | Fourth gear input | REV signal input | PWM signal input |
| M5 | Fifth gear input | Signal ground | TXD serial port |
| M6 | Mode selection | FAULT signal output | RXD serial port |
| M7 | Signal ground | Power indication output | Signal ground |
| M8 | Programming R/T | Speed feedback signal | NG |

E, N, L are power inputs of the user-end system

A slot is disposed on the mother circuit board, and a connector 2 is disposed on the daughter circuit board. The connector 2 is received in the slot 1 whereby electrically connecting the daughter circuit board to the mother circuit board.

Figure 7:
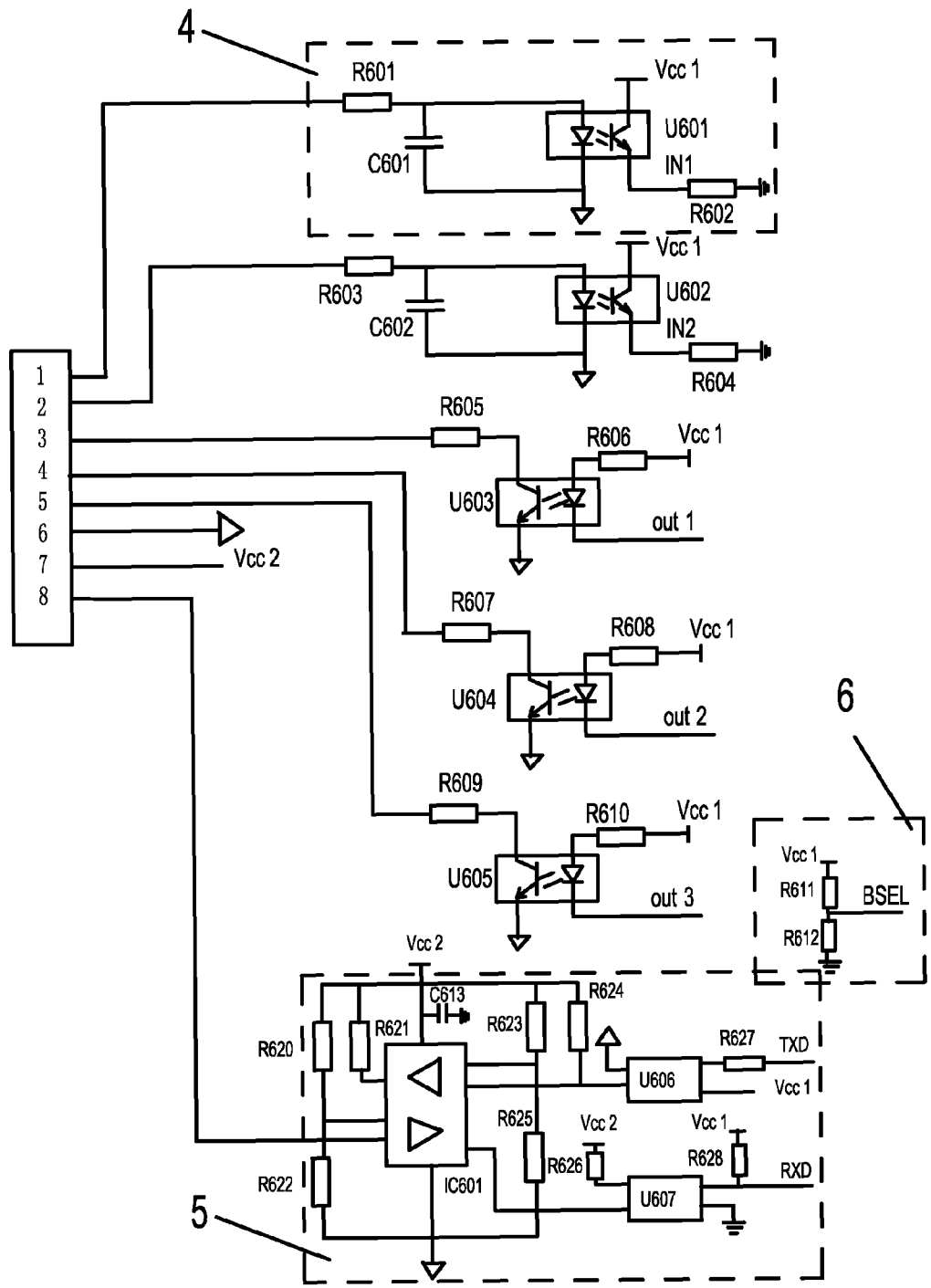
FIG. 7 is a schematic diagram of a first daughter circuit board of a motor controller of the invention.

As shown in FIG. 7, the identifying circuit 6 is a voltage division circuit formed by a pair of resistors R611 and R612 serially connected to each other, and a power supply on the mother circuit board supplies power to the identifying circuit 6. An output end BSEL of the identifying circuit 6 is connected to an input end of the controlling and processing unit. Multiple separating circuits 4 parallel to each other are disposed on the first daughter circuit board, one end of the separating circuit 4 is connected to an output end of a user-end control system, and the other end thereof is connected to the controlling and processing unit. A circuit unit 5 for serial connection is disposed on the first daughter circuit board.

Figure 8:
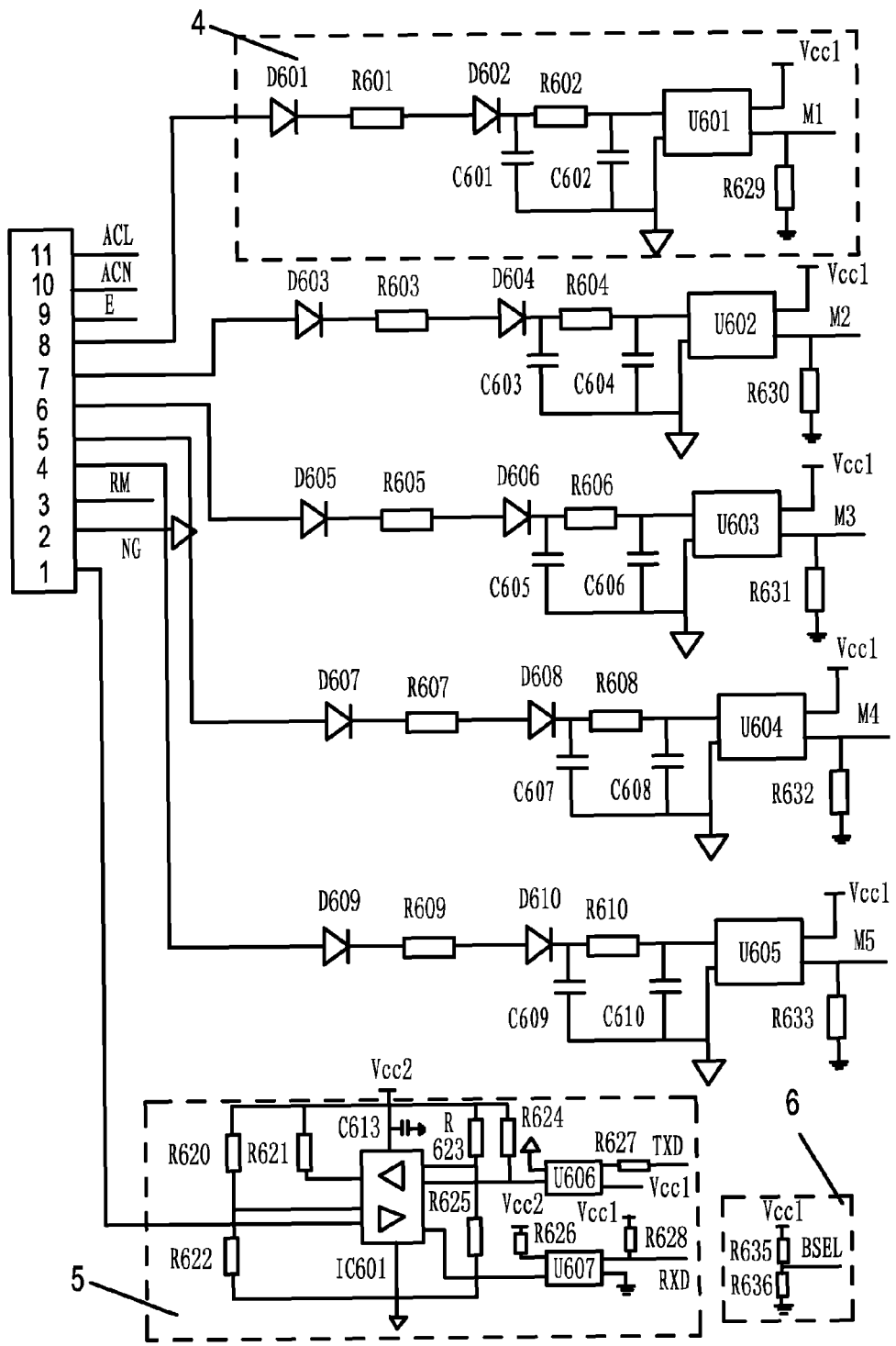
FIG. 8 is a schematic diagram of a second daughter circuit board of a motor controller of the invention.

As shown in FIG. 8, the identifying circuit 6 is a voltage division circuit formed by a pair of resistors R635 and R636 serially connected to each other, and a power supply on the mother circuit board supplies power to the identifying circuit 6. An output end BSEL of the identifying circuit 6 is connected to an input end of the controlling and processing unit. Multiple separating circuits 4 parallel to each other are disposed on the first daughter circuit board, one end of the separating circuit 4 is connected to an output end of a user-end control system, and the other end thereof is connected to the controlling and processing unit. A circuit unit 5 for serial connection is disposed on the second daughter circuit board.

A control method of a motor controller of the invention comprises: setting main functional circuits of the motor controller on a mother circuit board, setting an interface circuit unit and an identifying circuit on multiple daughter circuit boards, connecting one of the daughter circuit boards to the mother circuit board, and informing a controlling and processing unit on the mother circuit board of automatically configuring types of input/output ports on the daughter circuit board by the identifying circuit on the daughter circuit board. By changing the daughter circuit board, the invention can be applied to various occasions and features wide application, and other circuit parts and software parts of the motor controller remain unchanged, which enables motor manufactures to reduce the number of motor types for management, reduces development cost, development cycle, and product cost, simplifies a production technique, and improves efficiency.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor controller for an electronic driving motor, comprising:
   a controlling and processing unit;
   an interface circuit unit; and
   an identifying circuit;
   wherein
   said controlling and processing unit is disposed on a mother circuit board;
   said interface circuit unit and said identifying circuit are disposed on a daughter circuit board;
   said mother circuit board and said daughter circuit board are connected to each other whereby forming electric connection;
   said identifying circuit inputs an identifying signal to said controlling and processing unit;
   said controlling and processing unit automatically configures types of input/output ports of said interface circuit unit according to said identifying signal; and
   said motor controller is connected through said interface circuit unit to a user-end control system.

2. The motor controller of claim 1, wherein identifying circuits corresponding to different interface circuit units output different signals whereby forming different daughter circuit boards.

3. The motor controller of claim 1, wherein
   said identifying circuit is a voltage division circuit formed by a pair of resistors serially connected to each other; and
   a power supply on said mother circuit board supplies power to said identifying circuit.

4. The motor controller of claim 1, wherein
   said interface circuit unit uses multiple separating circuits parallel to each other;
   one end of said separating circuit is connected to an output end of a said user-end control system; and
   the other end thereof is connected to said controlling and processing unit.

5. The motor controller of claim 4, wherein
   an output end of said controlling and processing unit is connected to a power drive circuit module;
   an input end of said controlling and processing unit is connected to an output end of a rotor position sensing circuit; and
   said power drive circuit module and said rotor position sensing circuit are disposed on said mother circuit board.

6. The motor controller of claim 5, further comprising a power supply circuit and an analog sensing circuit disposed on said mother circuit board.

7. The motor controller of claim 5, wherein
   said output end of said user-end control system comprises eleven terminal lugs E, N, L, M1, M2, M3, M4, M5, M6, M7, and M8;
   said outputs lines E, N, and L are power lines connected to said mother circuit board; and
   said outputs lines M1, M2, M3, M4, M5, M6, M7, and M8 are electrically connected to said controlling and processing unit via an optoelectronic separating circuit on said daughter circuit board.

8. The motor controller of claim 5, wherein
   a pair of slots is disposed on said mother circuit board and operates to receive said daughter circuit board; and
   a pair of connectors is disposed on said daughter circuit board and received in said slots.

9. The motor controller of claim 5, wherein said controlling and processing unit is a CPU, a micro controller unit, or a digital signal processor.

10. A method for controlling a motor controller, comprising:
    setting main functional circuits of said motor controller on a mother circuit board;
    setting an interface circuit unit and an identifying circuit on multiple daughter circuit boards;
    connecting one of said daughter circuit boards to said mother circuit board;
    informing a controlling and processing unit on said mother circuit board of automatically configuring types of input/output ports on said daughter circuit board by said identifying circuit on said daughter circuit board by sending an identifying signal; and
    configuring the types of input/output ports of said interface circuit unit on said daughter circuit board by said controlling and processing unit according to the identifying signal.

11. A motor controller for an electronic driving motor, comprising:
    a mother circuit board comprising a controlling and processing unit; and
    several daughter circuit boards each comprising an interface circuit unit and an identifying circuit;
    wherein
    said controlling and processing unit integrates several configurators of said several daughter circuit boards, wherein said several configurators adapt one to each of said several daughter circuit boards;
    said mother circuit board and one of said several daughter circuit boards are connected to each other whereby forming an electric connection; and
    said identifying circuit of said one of said several daughter circuit boards inputs an identifying signal to said controlling and processing unit, and one of said several configurators adapting to said one of said several daughter circuit boards is activated, whereby said controlling and processing unit automatically configures types of input/output ports of said interface circuit unit of said one of said several daughter circuit boards.

* * * * *